Aug. 27, 1940.  J. MERCIER  2,212,922
HYDRAULIC SHOCK ABSORBER
Filed Dec. 8, 1937
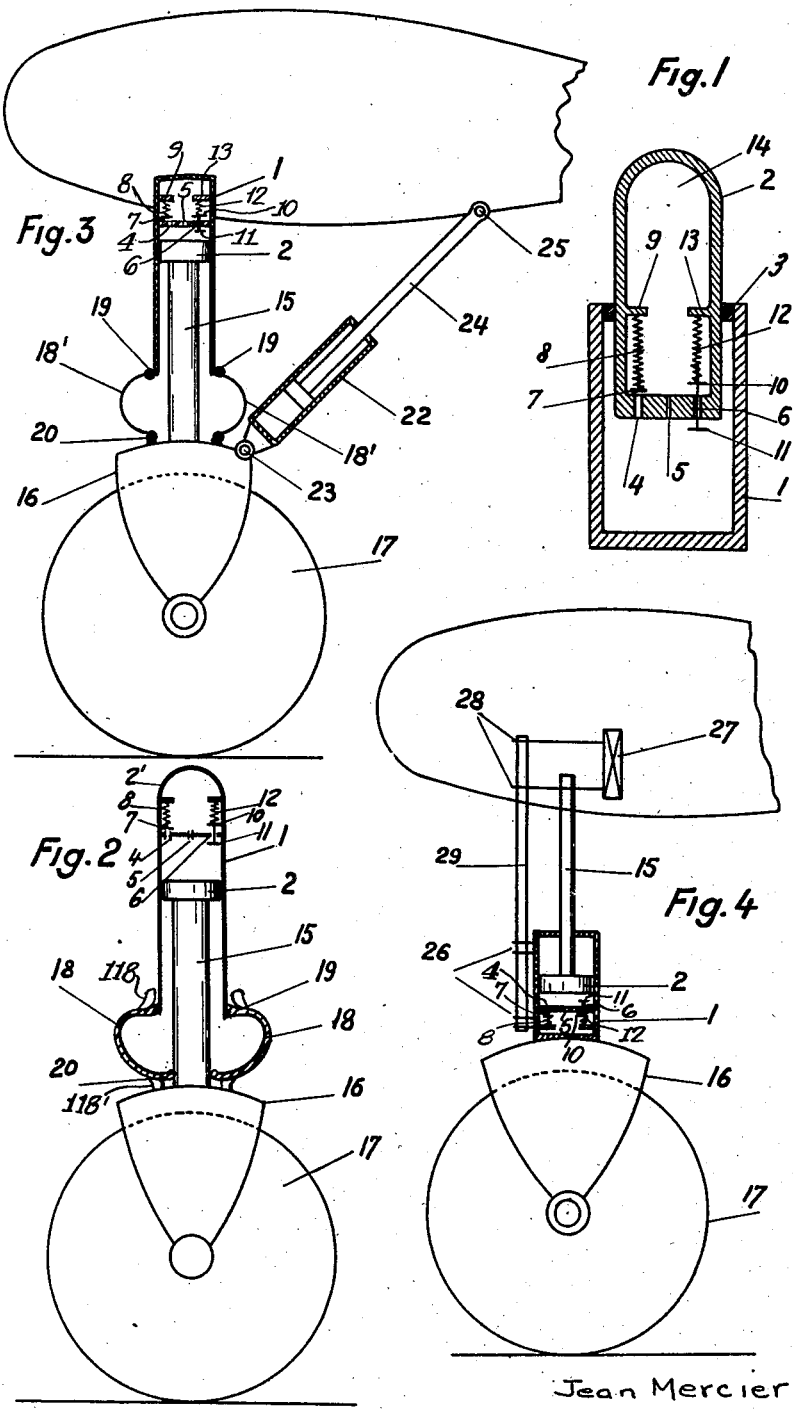
Jean Mercier
INVENTOR
By Otto Munk
his ATTY.

Patented Aug. 27, 1940

2,212,922

UNITED STATES PATENT OFFICE 2,212,922

HYDRAULIC SHOCK ABSORBER

Jean Mercier, Neuilly-sur-Seine, France

Application December 8, 1937, Serial No. 178,693
In France September 27, 1937

15 Claims. (Cl. 267—8)

The present invention has for its object a hydraulic shock-absorber, of the type comprising two elements slidably mounted one within the other, said shock-absorber being chiefly adapted for use on landing gear for airplanes. The said shock-absorber consists principally of two parts containing oil or another liquid, and one of which is slidable in the other after the manner of a cylinder and a piston. It is characterized in that it provides for a differential operation of the shock-absorber according to the rate of the relative movements of the two slidable elements, and in that the partition separating the two chambers which are formed by the two slidable elements and which are filled with liquid, comprises three circuits of communication, one of which is always open, has a relatively small section, and only allows slow movements of the said slidable elements in either direction, while the other two circuits have a relatively large section, thus affording a great output of the fluid, these latter circuits being provided with check-valves or poppet-valves having calibrated reaction springs. One of the said valves comprises an additional closing member. The said springs have different forces, and are adapted to close the two circuits of large output. They are mounted on the wall separating the two chambers which are formed by the said slidable parts.

In order to insure non-leaking conditions for the said apparatus, use may be made of suitable packing or of a stuffing-box located between the two slidable parts.

On the other hand, the said parts may be surrounded by an elastic ball-shaped device which is secured at one end to one of the said slidable parts and at the other end to the second slidable part. The said device comprises an air chamber the volume of which is reduced when one of the parts is driven into the other, and is expanded when these parts are separated. Thus the device will serve for non-leaking purposes, and will also act as an elastic reaction device which will have a tendency to bring the two slidable parts into a relative mean position.

This elastic reaction device may also consist of springs of a curved shape or of the elliptical type, which surround the two aforesaid parts and are secured at their ends to the two respective parts.

By the use, as an elastic reaction device, of a ball-shaped member forming an air chamber, or of spring strips which connect the two slidable parts together, these two parts are also held against relative rotation.

This affords a great advantage when the shock-absorber is to be mounted on a strut carrying the wheel of a landing device. In this case, the two tubular parts of the telescoping type are secured respectively to the wheel and to the fuselage or to any other stationary part of the airplane. This obviates the use of the known devices with grooves and keys.

In the case in which an elastic ball-shaped device or spring strips, are employed in order to prevent the relative rotation of the two parts, it is possible to reduce the angular stresses exerted upon the ball-shaped device or the springs, by connecting the wheel axis or a member carrying this axis, to a fixed point of the airplane by pivot joints and by means of an extensible strut.

It is further possible to prevent such relative angular movements of the two slidable parts, by means of a bar which passes through lugs provided upon collars or the like which are secured to the two parts.

Further features of the invention will be disclosed in the following description.

In the accompanying drawing, which are given by way of example:

Fig. 1 shows a shock-absorber in conformity with the invention.

Fig. 2 shows a shock-absorber mounted on the landing gear of an aeroplane and comprising an elastic ball-shaped device or spring plates forming an elastic device and preventing the two slidable parts of the shock-absorber from turning with reference to each other.

Fig. 3 shows landing gear of the type represented in Fig. 2, in which a forked bracket or like part supporting the axis of the wheel is pivoted to an extensible strut which is pivotally mounted at a fixed point on the airplane body.

Fig. 4 shows another embodiment.

In the embodiment shown in Fig. 1, the shock-absorber consists of two tubular parts 1 and 2, part 2 being slidable in part 1. The space or chamber between these two parts is filled with a liquid, and a sealing joint between these two parts is formed by means of a packing member 3 or the like. The bottom wall which separates the inner part of element 2 from the inner part of element 1 is provided with three orifices 4, 5 and 6. Orifice 5, which has a small diameter, is always open. Orifice 4, which has a relatively large diameter, is normally closed by a valve 7 controlled by a calibrated spring 8 which bears at the other end upon a boss 9 situated in part 2. The said valve can only open when the pressure in part 1 increases to a dangerous value. The third orifice 6, the diameter of which is also relatively large, is provided with a double valve 10—11 subjected to the action of a relatively weak spring 12 which bears upon a boss situated within part 2. The said spring tends to close orifice 6 by means of part 10 of the double valve 10—11.

The operation of this shock-absorber is as follows: When part 2 rises or descends slowly, the resistance of the shock-absorber is relatively great, due to the fact that the liquid in order to balance the pressures in 1 and 2 can only pass through the small orifice 5, orifices 4 and 6 being closed by their respective valves 7 and 10. On the contrary, when part 2 is lowered at an average speed, valve 10 is driven back against its spring 12 under the effects of the pressure exerted upon part 11, and thus the fluid can readily pass through the large orifice 6.

For this kind of displacements, the shock-absorber will operate smoothly. On the contrary, if part 2 descends abruptly, the sections of orifices 5 and 6 will not be sufficient to balance with a sufficient speed the pressures in the two tubular parts. The pressure in part 1 will considerably increase, thus closing valve 11 against the weak spring 12. At this moment, if the chambers in the two parts were only connected by the narrow orifice 5, the damping would take place in a very abrupt way. It will be noted that in this case, (the balancing being only possible through the small orifice 5), the pressure in part 1 may reach values which are dangerous for the apparatus. For this reason, the force of spring 8 which normally closes the valve 7, is so chosen that this valve will open when the pressure prevailing above it rises to a dangerous point. In these conditions, the large orifice 4 will open when the pressure reaches this limit, and the balancing of the pressures will take place through the orifices 4 and 5.

When part 2 rises in part 1, the resistance of the shock-absorber is still rather high, as the two orifices 4 and 6 remain closed, and the balancing can only take place through orifice 5.

Fig. 2 shows a modification, in which the shock-absorber of the above-mentioned type is mounted on the landing gear of an airplane. In this figure, the shock-absorber is represented in an entirely diagrammatic manner by a cylinder 1 and a piston 2. The cylinder is connected at the top to a fixed point on the airplane; the rod 15 of the piston 2 is secured to a forked bracket or like member 16 carrying the axis of the wheel 17 of the landing gear. Obviously, the shock-absorber 1—2 may be constructed in practice in the form of two tubular parts 1 and 2 which are mutually slidable and have all the features (valves and orifices) shown in Fig. 1.

In order to obtain non-leaking conditions between the parts 1 and 2, as well as an elastic return to the idle position, the two parts 1 and 2 are connected, for instance, to an elastic ball-shaped device 18, consisting of rubber or like material. The said device is connected at 19 and 20, in a non-leaking manner, to the two slidable parts, respectively. This tight connection for the elastic device is preferably made by vulcanizing the rubber on the metallic surface of the two parts 1 and 2, and if necessary, in order to give greater strength to this connection, between this metallic surface and an outer collar such as 118, 118' which is fitted upon the rubber at this point.

As the ball-shaped device is filled with air, it will have a tendency, after any deformation caused by the relative movements of the parts 1 and 2, to restore these latter to the mean position.

The ball-shaped device 18 may consist of a sufficiently strong material, such as rubber provided with threads having a diagonal weave (crossed cords), or the like, and in this case it can also serve to prevent the two parts 1 and 2, and hence the wheel 17 and the airplane body, from turning with reference to each other. This will obviate the use of the means hitherto employed for this purpose, such as grooves or keys which serve to secure the parts 1 and 2 together in the angular direction.

The ball-shaped device may also be replaced by spring strips. The said springs may be located between the two parts 1 and 2 and may be pivoted, respectively at 19 and 20, to these parts. In this construction, an elastic return is also provided. At the same time, the said springs may serve to prevent the parts 1 and 2 from turning with reference to each other.

It is evident that the springs will not serve for non-leaking purposes, and thus a special joint must be provided between the parts 1 and 2, which may resemble the one shown at 3 in Fig. 1.

Fig. 3, which is in principle identical with Fig. 2 shows another method for connecting the two parts together in the angular direction. This method consists in connecting the member 16 carrying the axis of the wheel, or the axis itself, to an extensible strut, consisting for example of a telescoping system 22—24 which in the present case is pivoted at one end to the member 16 at 23 and at the other end to the airplane body at 25.

The said extensible strut could obviously be used in combination with a ball-shaped device or springs 18', as shown in Fig. 2, and herein it will serve to reduce the torsion stress exerted upon the elastic parts 18'.

Fig. 4 shows another construction, in which the two parts 1 and 2 are connected together in the angular direction by a rod 29 passing through superposed lugs, one set, lugs 26, being mounted on part 1, and the other set 28, on part 2, or again, as shown in Fig. 4, on the body of the airplane or the spar 27.

Obviously, the invention is not limited to the forms of construction herein described and represented, which are given solely by way of example.

For instance, instead of using the orifices 4, 5, 6 and their accessories upon a movable separating wall, as shown in Fig. 1, they can be used equally well on a fixed wall, as shown in Fig. 2, thus forming a second chamber in the cylinder.

Having now described my invention, what I claim as new and desire to secure by Letters Patent is:

1. A hydraulic shock-absorbing device comprising two members forming a piston and cylinder like arrangement, one of said members being slidable within the other and forming a deformable chamber, which is filled with a suitable fluid, separating means in said chamber creating two compartments, three circuits of communication in said separating means between said compartments, one of said circuits being always open and having a relatively small cross-section so as to afford only slow movements of the two slidable parts in both directions, the other two circuits having relatively large cross-sections, thus allowing the fluid to flow at a considerable rate, valve means in said two latter circuits, and preferably calibrated reaction elements acting upon said valve means, one of said valve means being of the double type and provided with an additional closing part, said reaction elements being of different force, adapted to close said two latter circuits and mounted on said separating means.

2. A hydraulic shock absorbing device comprising two members forming a piston and cylinder like arrangement, one of said members being slidable within the other and forming a deformable chamber, which is filled with a suitable fluid, separating means in said chamber creating two compartments, channel means in said separating means constituting three circuits of communication between said compartments, one of said channel means being always open and having a relatively small cross-section so as to afford only slow movements of the two slidable parts in both directions, the other two channel means having relatively large cross-sections, thus allowing the fluid to flow at a considerable rate, valve means in said two latter channels, and, preferably calibrated reaction elements acting upon said valve means, one of said valve means being of the double type and provided with an additional closing part, said reaction elements being of different force, adapted to close said two latter channels and mounted on said separating means.

3. A shock-absorber as claimed in claim 1, wherein said valve means consist of two check-valves and wherein the force of the reaction element, such as a spring, acting upon the double valve is less than the force of the reaction element acting upon the other valve.

4. A shock-absorber as claimed in claim 1, wherein said double valve means consists of two obturating elements located on both sides of said separating means and of a rod connecting said elements and slidably located in said separating means.

5. A hydraulic shock absorbing device comprising two members forming a piston and cylinder like arrangement, one of said members being slidable within the other and forming a deformable chamber which is filled with a suitable fluid, separating means in said chamber, creating two compartments, three circuits of communication between said compartments provided in said separating means, one of said circuits being always open and having a relatively small cross-section so as to afford only slow movements of the two slidable parts in both directions, the other two circuits having relatively large cross-sections, thus allowing the fluid to flow at a considerable rate, valve means in said two latter circuits, and preferably calibrated reaction elements acting upon said valve means, one of said valve means consisting of two obturating elements located on both sides of said separating means, and of a rod connecting said elements and slidably located in said separating means, the force of the reaction element, such as a spring, acting upon the double valve being less than the force of the reaction element acting upon the other valve.

6. A shock absorbing device comprising two members forming a piston and cylinder like arrangement, one of said members being slidable within the other and forming a deformable chamber, which is filled with a suitable fluid, separating means in said chamber, creating two compartments, three circuits of communication in said separating means between said compartments, one of said circuits being always open and having a relatively small cross-section so as to afford only slow movements of the two slidable parts in both directions, the other two circuits having relatively large cross-sections, thus allowing the fluid to flow at a considerable rate, valve means in said two latter circuits, and preferably calibrated reaction elements acting upon said valve means, one of said valve means being of the double type and provided with an additional closing part, said reaction elements being of different force, adapted to close said two latter circuits and mounted on said separating means, the reaction element, such as a spring, which acts upon said double valve means being adapted to close the corresponding circuit in the idle position and during the slow deformation of the shock-absorber, and opening the said circuit against the action of the said spring in the case of movements of compression at average speed, but closing it again in the case of sudden compression.

7. A shock absorber according to claim 6, wherein said second reaction means is adapted to close the corresponding circuit for large output when in the idle position and during the extension, and also during all the movements of compression of the shock-absorber which will not cause any dangerous increase of the pressure in the cylinder-like member.

8. A shock-absorber according to claim 1 wherein said two slidable members consist of hollow bodies, the separating means pertaining to the piston-like member.

9. A shock-absorber according to claim 1, wherein one of said members consists of a hollow body, said separating means forming the two compartments being located in this body.

10. A shock-absorbing device according to claim 6 wherein said two slidable members consist of hollow bodies, and the separating means pertain to the piston-like member, and further means ensuring tightness between said slidable hollow members.

11. A shock-absorber comprising two slidably mounted members, forming a piston and cylinder like arrangement, partition means in the hollow closed spaced formed by said piston and cylinder and creating two compartments, channel means in said partition means forming three distinct circuits causing said compartments to communicate, one of said circuits being always open and having a relatively small cross-section so as to afford only slow movements of the two slidable parts in both directions, the other two circuits having relatively large cross-sections, thus allowing the fluid to flow at a considerable rate, valve means in said two latter circuits, preferably calibrated, reaction elements acting upon said valves, means, one of said valve means being of the double type and provided with an additional closing part, said reaction elements being of different force, adapted to close said two latter circuits and mounted on said partition means; and further an elastic part mounted between said slidable members and tightly secured to each of these members, thus forming an elastic reaction device.

12. A shock-absorber according to claim 11 wherein said elastic part consists of a balloon of rubberized fabric with crossed cords and is secured to the metallic surfaces of the slidable members by vulcanizing processes, and further metallic rings preferably provided on the rubber at the securing places in order to hold the rubber between metallic surfaces.

13. A shock-absorber according to claim 11 wherein said elastic part consists of a balloon of rubberized fabric with diagonal cords and is secured to the metallic surfaces of the slidable members by vulcanizing processes, and further metallic rings preferably provided on the rubber at the securing places in order to hold the rubber between metallic surfaces.

14. A shock-absorber according to claim 11 wherein said elastic part consists of spring strips which also solidarize said slidable members as to angular relative movement.

15. Landing gear for aircraft and the like, comprising cooperating cylinder and piston damper members, one of them connected to the aircraft body and the other to the landing gear support, and providing a working chamber and a separate chamber, both containing damping fluid, means providing three passages between the chambers, one passage free but narrow and adapted to afford only slow reciprocations of the gear, the second substantially larger so as to moderately damp average speed movements, and the third likewise substantially larger, double valve means for controlling the second passage and including a normally closed non-return valve loaded to open at a moderate pressure and a normally open check-valve loaded to be closed by a rush of fluid, and a relief valve for controlling the third passage, loaded to open when the fluid pressure nears a dangerous value, thereby to provide for a two-stage flow for a moderate damping at running and smooth landings, a further two-stage flow for a strong damping at rough landings, and a restricted flow for moderately damping the return strokes or rebounds of the gear.

JEAN MERCIER.